ROBINSON BROWN & EDWIN A. BLAISDELL.
Improvement in Coffee Pots.
No. 120,936.                                           Patented Nov. 14, 1871.
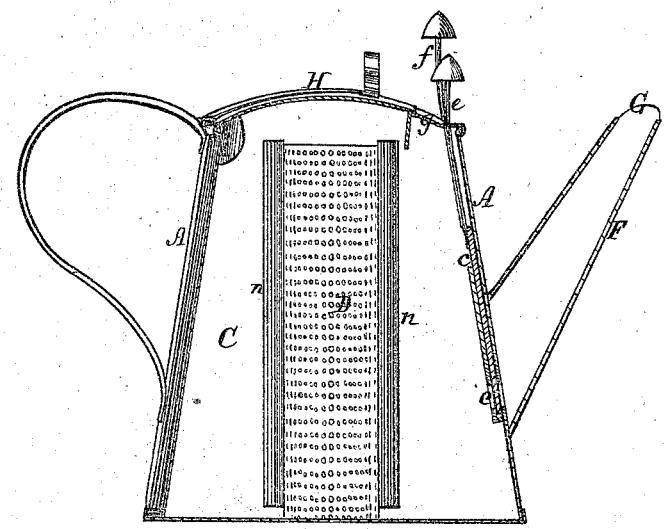
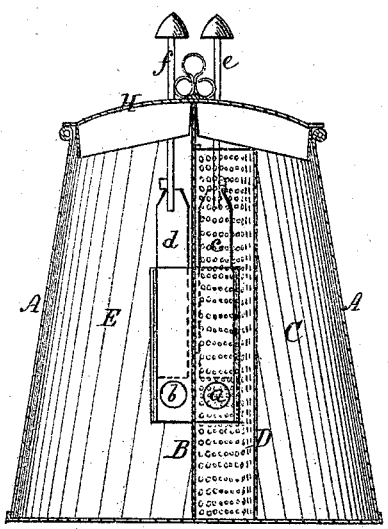
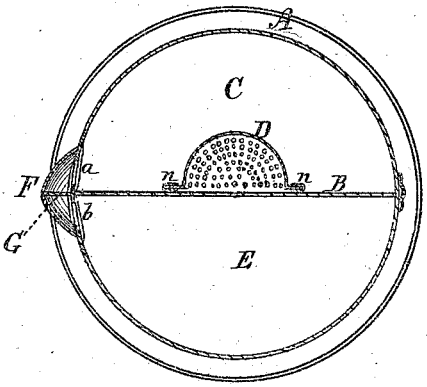

No. 120,936

UNITED STATES PATENT OFFICE.

ROBINSON BROWN AND EDWIN A. BLAISDELL, OF GOFFSTOWN, N. H.

IMPROVEMENT IN COFFEE-POTS.

Specification forming part of Letters Patent No. 120,936, dated November 14, 1871.

*To all whom it may concern:*

Be it known that we, ROBINSON BROWN and EDWIN A. BLAISDELL, of Goffstown, in the county of Hillsborough and State of New Hampshire, have invented a new and useful Improvement in Tea and Coffee Pots, of which the following is a specification:

Our invention relates to that class of tea and coffee pots having separate and distinct compartments, in one of which tea or coffee may be made and hot water retained in the other, for use either separately or together with the decoction, as may be desired.

In the accompanying drawing, Figure 1 represents a vertical section of a tea or coffee pot embracing our invention; Fig. 2, a similar section at right angles to that of Fig. 1; and Fig. 3 represents a horizontal section of the same.

The pot or vessel A may be of any desired form, and its chamber is divided vertically into two compartments by a partition, B, one of which compartments, C, is provided with a removable semi-cylindrical reticulated tube, D, into which tea or ground coffee is placed, being open at the top for that purpose, and having a bottom to retain the contents of the tube and allow them to be emptied by withdrawing it from its grooved holding-flanges $n$ upon the partition. The contents of this tube are subjected, through its reticulations, to the action of the boiling water, and while thus being fully exposed to make the proper decoction the liquid is retained clear and free from grounds or leaves, the perforations in the retainer-tube being sufficiently fine for this purpose. The other compartment E is to retain hot water, and, in order that it may be used separately or in connection with the decoction, the spout F is divided by a partition, G, into two separate channels, which communicate with the separate compartments by openings $a$ $b$ in the vessel on either side of the central partition. These openings $a$ and $b$, being thus arranged, are provided with separate valves $c$ and $d$, which may be controlled by vertical stems $e$ and $f$ passing through a ledge, $g$, in the top of the vessel, to cut off the communication with the spout of either or both compartments, or to graduate such communication so as to allow a limited supply of hot water to be poured out with the decoction when the latter is too strong; and as the partition of the spout extends to its mouth this graduation can be effected by sight, so as to produce the desired result in the strength of the decoction. The valves are arranged to slide in guides on the inner side of the vessel. The top H may be hinged or otherwise, so that it fits, when closed, upon the central partition, to separate the two compartments.

The vessel is thus adapted as a hot-water or tea or coffee pot, and in this respect is of greater advantage for table use.

Having described our invention, we claim—

The combination of the separate tea or coffee and hot-water compartments C E with the central removable perforated holding-tube D, the separate valves $c$ $d$ with their stems $e$ $f$, and the divided spout F, the several parts being constructed and arranged for use, as described, and represented in the accompanying drawing.

ROBINSON BROWN.
      EDWIN A. BLAISDELL.

Witnesses:
 CHARLES A. STORY,
 ALFRED STORY.    (136)